United States Patent [19]

Moriyama et al.

[11] Patent Number: 5,040,634
[45] Date of Patent: Aug. 20, 1991

[54] MOTOR VEHICLE WITH A TRANSVERSELY-DISPOSED ENGINE

[75] Inventors: Naomune Moriyama, Hiroshima; Reiji Kikuchi; Mitsuji Echigo, both of Higashi-hiroshima; Masaya Watanabe, Hiroshima, all of Japan

[73] Assignee: Mazda Motor Corporation, Japan

[21] Appl. No.: 470,189

[22] Filed: Jan. 25, 1990

[30] Foreign Application Priority Data

Jan. 27, 1989 [JP] Japan .................................. 1-18782

[51] Int. Cl.$^5$ ................................................ B60K 5/04
[52] U.S. Cl. ...................................... 180/297; 180/79; 180/147
[58] Field of Search ................. 180/291, 297, 79, 132, 180/146, 147, 148, 79.1, 79.3

[56] References Cited

U.S. PATENT DOCUMENTS

| | | | |
|---|---|---|---|
| 4,483,408 | 11/1984 | Yazaki | 180/297 |
| 4,648,476 | 3/1987 | Roe et al. | 180/297 |
| 4,716,984 | 1/1988 | Hiramatsu et al. | 180/297 |

FOREIGN PATENT DOCUMENTS 63-23219  6/1988  Japan .

Primary Examiner—Andres Kashnikow
Assistant Examiner—Richard Camby
Attorney, Agent, or Firm—Thompson, Hine and Flory

[57]  ABSTRACT

A motor vehicle with a transversely-disposed engine wherein a differential gear of a power plant is mounted transversely in the forward position of an engine, and a steering member is disposed in the upper position of an output shaft of the engine as well as in the rearward position of the engine. The advantages obtained in this arrangement are a reduced weight loaded on front wheels, a simplified steering system and a facilitated layout of the steering member. Knuckle arms are provided with long arm portions with which tie rods are connected. These tie rods are connected with the steering member at the center thereof. Accordingly, the tie rods can be long enough while necessary steering angle of the front wheels can be obtained. Thus, the toe angle fluctuation can be restrained and the steering rigidity can be improved.

19 Claims, 4 Drawing Sheets

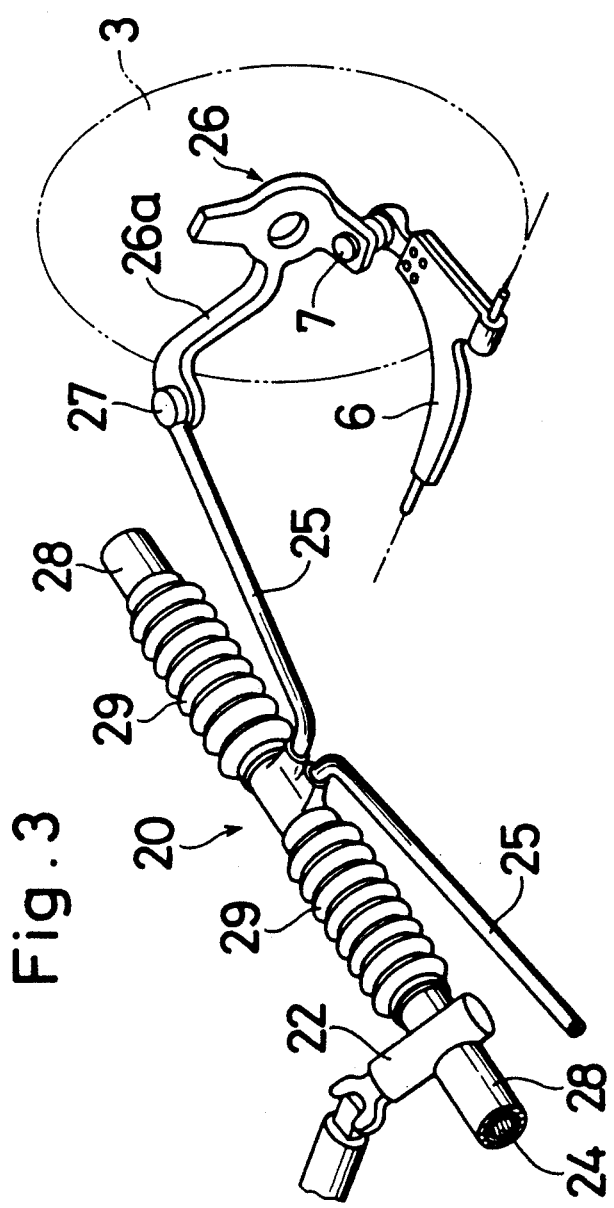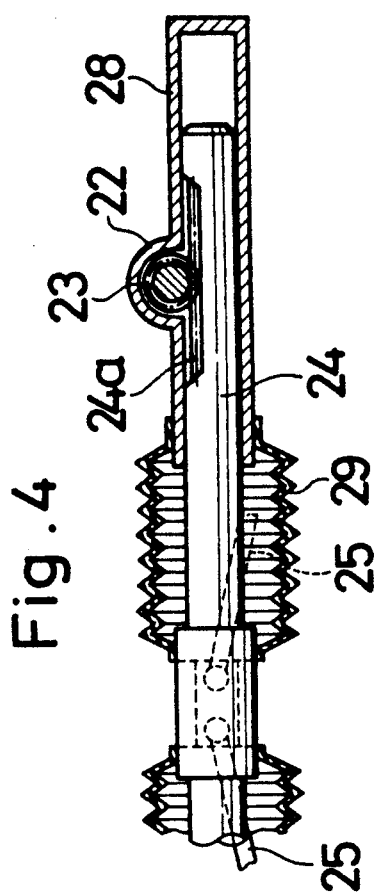

MOTOR VEHICLE WITH A TRANSVERSELY-DISPOSED ENGINE

BACKGROUND OF THE INVENTION (a) Field of the Invention

The present invention relates to a motor vehicle with a transversely-disposed engine wherein axes of output shafts of the power plant are extending in the widthwise direction of the vehicle.

(b) Description of the Prior Art

In a front-engine and front-drive car, a power plant is mounted in an engine compartment located in the front portion of a vehicle so as to dispose axes of output shafts of the power plant in the widthwise direction of the vehicle body. In this type of a car with transversely-disposed engine, an axis of output shaft of an engine of the power plant is usually positioned in the forward direction of an axis of output shaft of a differential gear or the center of a front wheel. In this arrangement, however, since the gravitational center of the power plant is positioned in the forward direction of the center of the front wheel, relatively large amount of load is generated due to the weight of the power plant and the moment induced by the weight thereof. This relatively large load acts on the front wheels. As a result, the increased load acting on the front wheels leads to the steering characteristic showing strong understeer propensity. Another disadvantage of the aforementioned arrangement is that flexible designing of the front portion of the vehicle cannot be allowed since the engine is located in the forward position of the front wheels. Furthermore, the wheel housing becomes close to a vehicle cabin because the front wheels are in the rearward position of the engine. This will make the arrangement of various pedals in the front portion of the vehicle difficult and complex.

To solve the above-mentioned probems involving motor vehicles with transversely-disposed engines, especially front-engine and front-drive cars, Japanese Utility Model Application Publication Gazette No. 63-23219 discloses the following arrangement. As shown in FIG. 5, an axis of output shaft x of an engine B constituting a power plant A is positioned in the rearward direction of an axis of output shaft y of a differential gear C or the center z of a front wheel D. A steering member E such as a rack shaft extending in the widthwise direction of the vehicle body to steer the front wheel D is disposed in the forward direction of the power plant A. With this construction, a load acted on the front wheel D is alleviated and thus the excessive understeer propensity of the steering characteristic will be avoided. Flexible design of the front portion of the vehicle and layout of various pedals therein will become possible.

In the arrangement disclosed in the above-mentioned Publication Gazette, a steering system comprising a steering rod F for transmitting the handling of the steering wheel to the steering member E which disposed in the forward direction of the power plant A must be guided to the forward portion of the power plant A through the upper space of a transmission G and the differential gear C of the power plant A. This means that the steering system will be excessively long and must be bended in a complex manner. Furthermore, since the space in the forward portion of the power plant A is rather limited, the layout of the steering member E will be difficult.

The steering rod F is located in the upper direction of the transmission G and the differential gear C. Accordingly, the steering member E is placed in relatively high position. This means that the different in the height between the connecting part of a tie rod which is connected to the steering member E and a lower arm which is a constituent member of the suspension mechanism of the front wheel D will increase. As a result, the problem of a toe angle fluctuation of the front wheels occurs. The toe angle fluctuation is a phenomenon that the toe angle of the front wheels fluctuates when the vehicle bumps or rebounds, causing the deterioration of the steering characteristic. "Bump" refers to the state that the suspension of the front wheels shrinks, causing the front wheels to rise. "Rebound" refers to the state that the suspension of the front wheels extends, causing the front wheels to lower. When the steering member is in the higher position than the lower arm, in the case of bump, the connecting part of the lower arm on the front wheel side travels to the inward direction of the vehicle, and the connecting part of the tie rod on the front wheel side travels to the outward direction of the vehicle. Consequently, the toe angle moves to the inward direction. On the other hand, in the case of rebound, the toe angle moves to the outward direction. In this way, toe angle fluctuation becomes more noticeable when the length of the tie rod becomes shorter and the connecting part of the tie rod on the steering member side becomes higher than the lower arm.

SUMMARY OF THE INVENTION

The present invention is devised to solve the above-mentioned problems which arise in the motor vehicle with the transversely-disposed engine, especially the vehicle wherein the weight distribution of the power plant for the front wheels is improved by mounting the differential gear in the frontward direction and arranging the gravitational center of the power plant in the rearward direction. The principal object of the present invention is to facilitate the flexible layout of a steering member and other parts as well as to simplify the steering for transmitting the handling force of the steering wheel to the steering member. Further object of the invention is to obtain favorable steering characteristic by restraining the toe angle fluctuation while maintaining the necessary front wheel steering angle.

To achieve the aforementioned objects, the motor vehicle with a transversely-disposed engine of the present invention has a following construction.

First, a motor vehicle with a transversely-disposed engine of the present invention must be defined as follows; a power plant comprising an engine, a transmission and a differential gear is mounted so that axes of output shafts thereof are disposed in the widthwise direction of the vehicle body, and the differential gear is positioned forwardly of the engine. In the present invention, a steering member of a steering mechanism for steering front wheels, extending in the widthwise direction of the vehicle body, is positioned in the upper position of the output shaft of the engine in the power plant as well as in the rearward position of the engine.

Accordingly, the steering system for transmitting the handling maneuver of the steering wheel of the steering member is shortened and simplified. Another advantage is that there will be an unused space available in the upper rear portion of the engine. Thus, the layout of the steering member can be flexible and facilitated.

When the steering member is disposed in the upper position of the output shaft of the engine as well as in the rearward position of the engine, the difference in the height between a lower arm of a suspension mechanism for the front wheels and the steering member increases. This increase in the difference of the height leads to the aforementioned problem of the toe angle fluctuation. Further, since the center of the front wheel is located in the forward position of the engine, an arm portion of a knuckle arm with which one end of a tie rod is connected in order to steer the front wheel should be long and extended rearwardly. However, in this case, a ratio of a steering angle of the front wheels to a stroke of the steering member in the widthwise direction of the vehicle body, or a stroke for swinging the knuckle arm by means of the tie rod, will become small. This stroke of the steering member is limited due to the arrangement of the steering gear mechanism. After all, obtaining the necessary steering angle of the front wheels will be difficult.

To solve the above problem, the present invention provides the knuckle arm for steering the front wheels with a long arm portion extending rearwardly. And the other end of the tie rod wherein one end thereof is connected with the arm portion of the knuckle arm is linked with the center of the steering member.

With this arrangement wherein the tie rod is linked with the center of the steering member, the length of the tie rod becomes long enough, thereby restraining the toe angle fluctuation and obtaining the favorable steering characteristic. Since the tie rod is connected with the steering member at the center thereof, the interference between the tie rod and the steering gear is avoided. Thus, sufficient stroke of the steering member can be maintained while securing the necessary steering angle of the front wheels.

When the distance in the longitudinal direction of the vehicle body between the front wheel and the steering member becomes longer, an angle formed between the knuckle arm and the tie rod (an angle seen in the plan view of the vehicle body) will be excessively large. This results in an undesirable effect on setting a proper Ackerman angle. However, when the arm portion of the knuckle arm is extended, the angle formed between the knuckle arm and the tie rod can be set as properly as the case of the conventional vehicles, with a resultant increase in the steering rigidity.

BRIEF DESCRIPTION OF THE DRAWINGS

In the drawings:

FIG. 3 is a schematic perspective view of the steering mechanism;

FIG. 4 is a partially sectional view of a rack shaft of the steering mechanism;

DETAILED DESCRIPTION OF THE INVENTION

A description is made below of a preferred embodiment of the present invention, with reference to the accompanying drawings.

Figure 1:
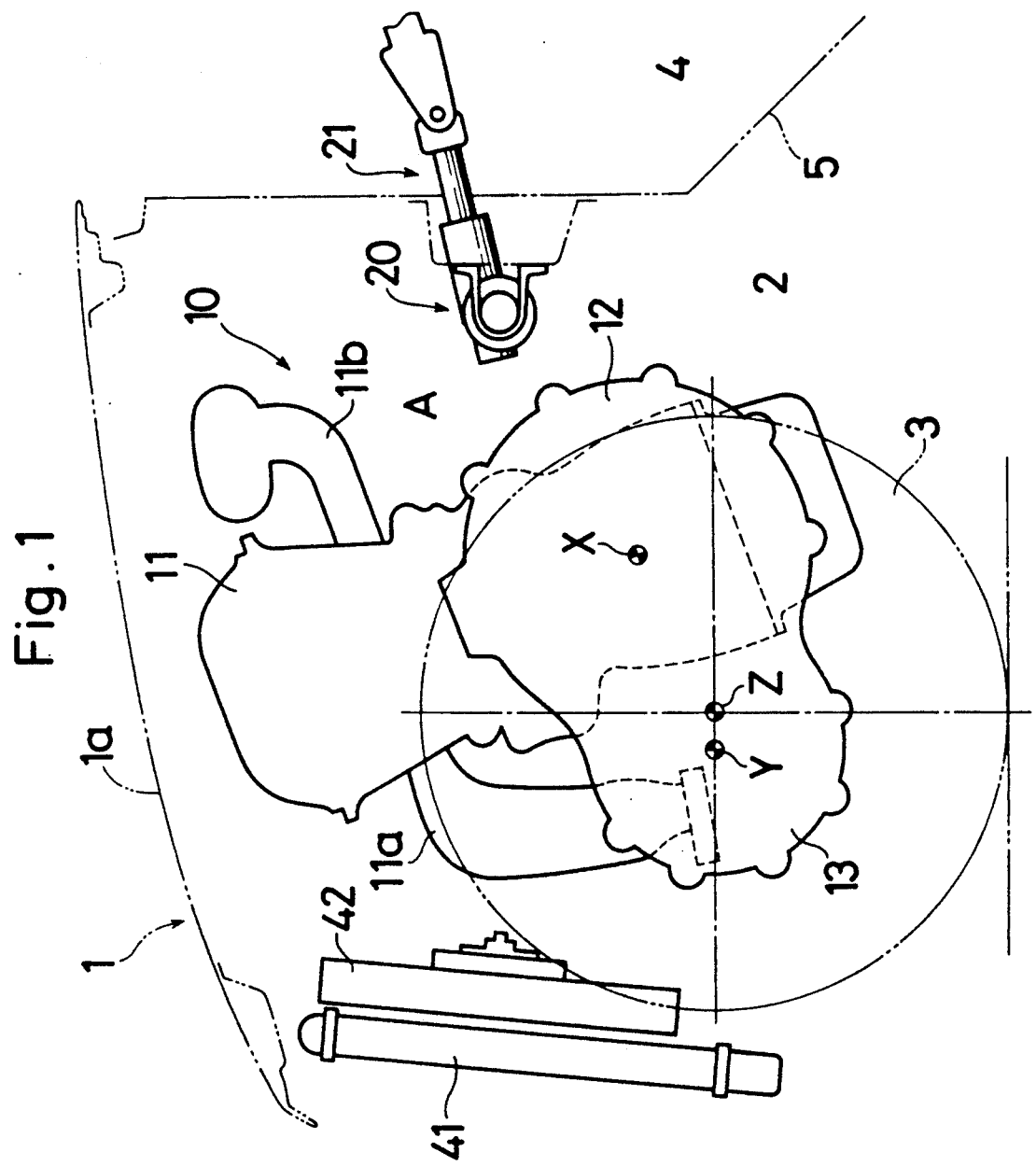
FIG. 1 is a schematic side view of a power plant and the peripheral area thereof.

Referring to FIG. 1, an overall construction will be described. A power plant 10 is mounted in an engine compartment 2 located in the front portion of a vehicle body 1. The power plant 10 comprises a engine 11, a transmission 12 and a differential gear 13. Both an axis X of a crank shaft of the engine 11 and a primary shaft of the transmission 12, and an axis Y of the differential gear 13 are disposed in the vehicle so as to extend in the widthwise direction of the vehicle body. The axis X of the crank shaft is located in the rearward position of the axis Y of the differential gear 13 or the center Z of a front wheel 3, i.e. the position close to the vehicle cabin 4. The differential gear 13 is mounted so as to protrude in the forward direction of the power plant 10.

A steering mechanism 20 which steers the front wheel 3 by means of a steering wheel (not shown in the drawings) inside the vehicle cabin 4 is placed in the rearward position of the power plant 10 and in the upper position of the axis X of the crank shaft. A steering system 21 for transmitting the handling maneuver of the steering wheel to the steering mechanism 20 passes through a dash panel 5 which partitions the vehicle cabin 4 and the engine compartment 2 to be connected with the steering mechanism 20.

Figure 2:
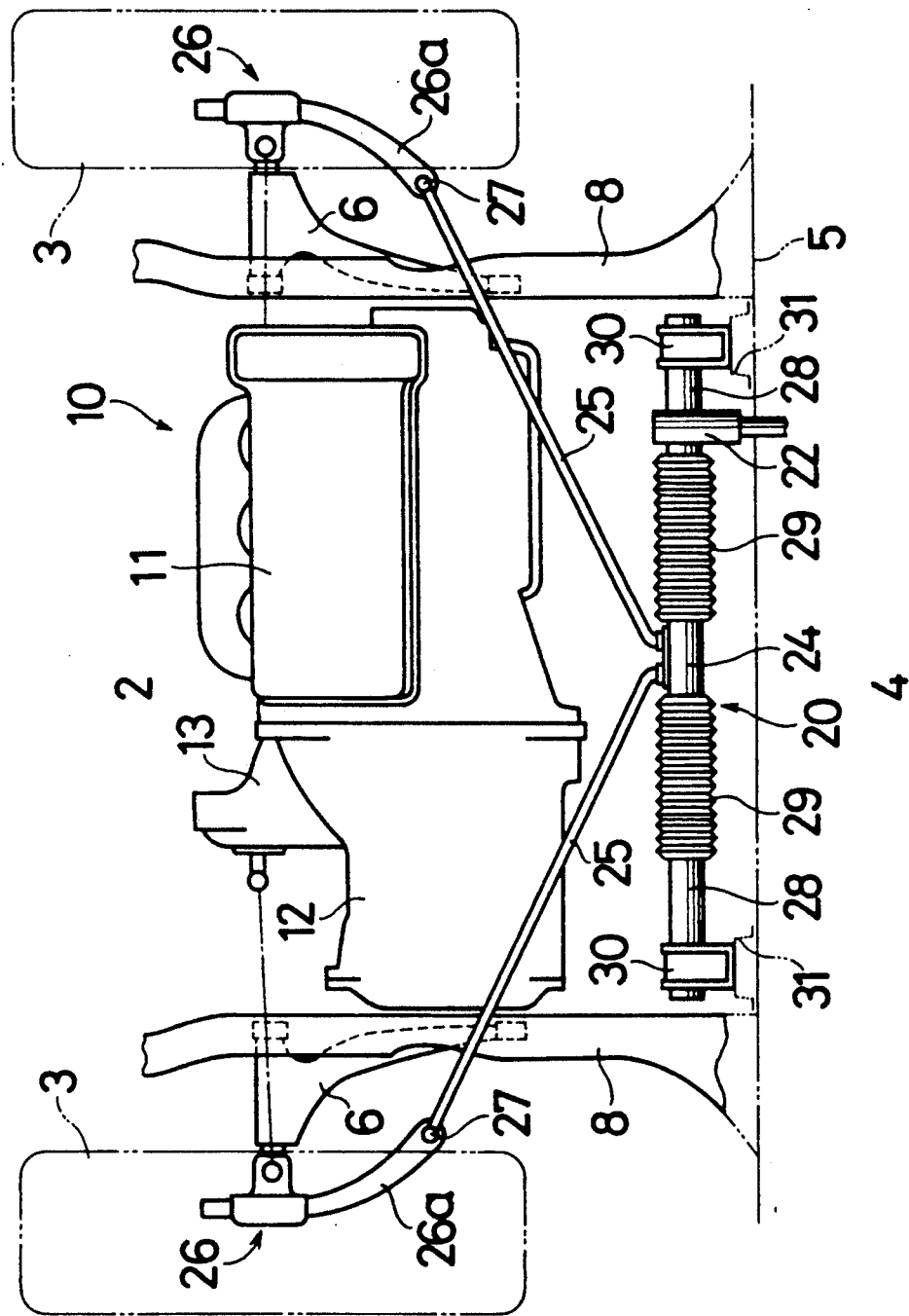
FIG. 2 is a schematic top plan view of the power plant and a steering mechanism.
Figure 5:
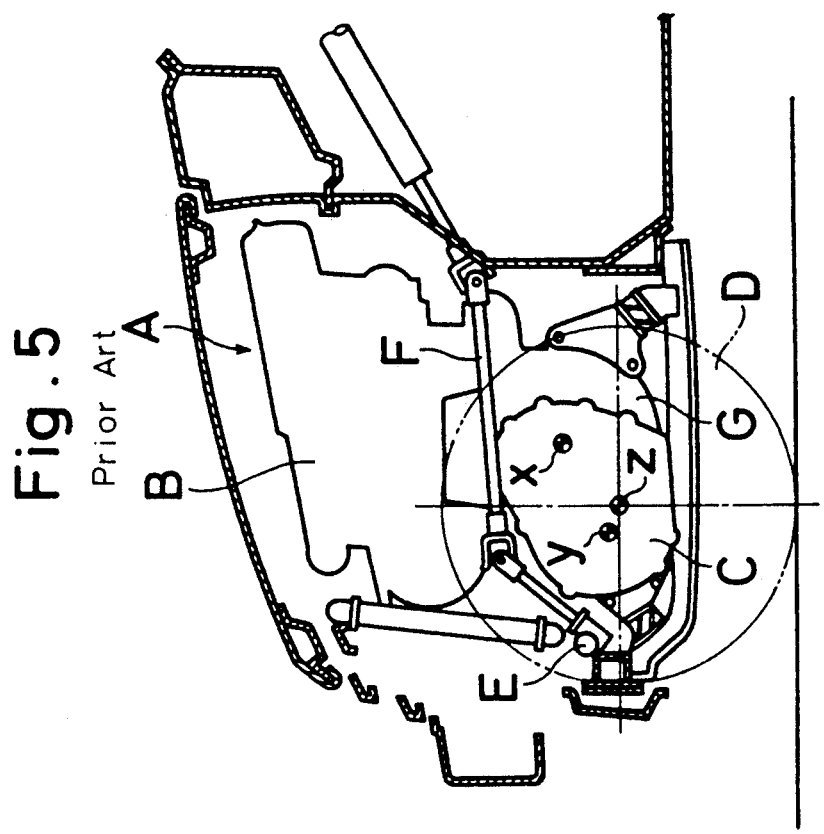
FIG. 5 is a side view of a power plant and the peripheral area thereof showing the prior art.

Next, the contruction of the steering mechanism 20 will be described with reference to FIGS. 2 through 4. The steering mechanism 20 comprising a rack shaft 24 (a steering member), a right and a left tie rods 25, 25 and a right and a left knuckle arms 26, 26. The rack shaft 24 extends in the widthwise direction of the vehicle body and engages with a pinion 23 inside a gear case 22. The right and the left tie rods 25, 25 are connected with the rack shaft 24 at the one ends thereof. The right and the left knuckle arms 26, 26 rotatably support each right and left front wheel 3, 3 and are swingably connected in the widthwise direction with lower arms 6, 6 of a suspension mechansim of the front wheels 3, 3 by means of king pins, 7, 7. The knuckle arms 26, 26 are provided with rearwardly extending long arm portions 26a, 26a. More specifically, these arm portions 26a, 26a have a length of 140 to 150 mm in the motor vehicle shown in the drawings compared with the conventional vehicle's 120 to 130 mm.

In the steering mechanism 20, sufficiently long tie rods 25, 25 are connected with the central part of the rack shaft 24 at the one ends thereof. The other ends of the tie rods 25, 25 are connected with the arm portions 26a, 26a of the knuckle arm 26, 26 by means of pins 27, 27. Right and left ends of the rack shaft 24 are slidably supported in the widthwise direction and accommodated within cylindrical rack shaft cases 28, 28 (refer to FIG. 4). Portions wherein the rack shafts 24 project outside the cases 28, 28 are covered with rubber boots 29, 29. The cases 28, 28 are fixed on the dash panel 5 by means of brackets 30, 30 and mounting members 31, 31. The lower arms 6, 6 are swingably supported in the vertical direction by side frames 8, 8 which are provided at the right and the left sides in the lower part of the engine compartment 2. As shown in FIG. 1, a radiator 41 and a cooling fan 42 are provided in the front of the power plant 10 in the engine compartment 2. The upper portion of the engine 11 of the power plant 10 inclines in the forward direction with an exhaust manifold 11a placed in the front thereof, and an air intake manifold 11b in the upper rear thereof. Therefore, an unused space is available in the lower part of the air intake manifold 11b at the rearward direction of the engine 11. The rack shaft 24 of the steering mechanism 20 is mounted in this space A.

Above-mentioned construction of the present invention yields the following advantages. Since the axis X of the engine 11 of the power plant 10 is disposed closer to the vehicle cabin 4 than the axis Y of the differential gear 13 of the power plant 10 or the center Z of the front wheel 3, the gravitational center of the power plant 10 will be in rearward of the center Z of the front wheel 3. Accordingly, a load generated by the power plant 10 will be carried by both the front and the rear wheels. Thus, the front wheels 3 are relieved of the excessive load. In this way, the excessive understeer propensity of the steering characteristic is corrected and the favorable steering characteristic will be obtained.

Since the engine 11 is located rearward of the front wheel 3 in the present invention, the flexiblity can be increased in setting the amount of an overhang from the center Z of the front wheel 3 to the front end of the vehicle body 1, and the height of a bonnet 1a in the front portion of the vehicle. As a result, various designs of the front portion of the vehicl are possible. Further, since the front wheel 3 is located in the forward position of the engine 11, flexibility in the layout of the various pedals in the vehicle cabin 4 will be also increased.

The rack shaft 24 of the steering mechanism 20 is provided on the space A which is in the upper position of the axis X of the crank shaft of the engine 11 in the rear of the power plant 10. Therefore, the steering system 21 for transmitting the handling maneuver of the steering wheel inside the vehicle cabin 4 to the rack shaft 24 by means of the pinion 23 can be short in the length with a simple construction of fewer bending portions. Layout of the rack shaft 24 will be facilitated because the rack shaft 24 is located in the relatively wide space A.

Ends of the right and the left tie rods 25, 25 of the steering mechanism 20 are connected with the central part of the rack shaft 24. Consequently, the length of the tie rods 25, 25 is sufficiently long. This means that in spite of the considerable difference in the height between the connecting part of the tie rods 25, 25 and the lower arms 6, 6, the toe angle fluctuation can be restrained.

The center of the front wheel 3 is located forward of the axis X of the crank shaft, and the rack shaft 24 and the tie rods 25, 25 are located rearward of the engine 11. Accordingly, in this construction, the arm portions 26a, 26a of the knuckle arms 26, 26 are extended in the rearward direction. In order to obtain the necessary steering angle of the front wheels in this construction, it will be required to increase the width of the stroke of the rack shaft 24 in the widthwise direction of the vehicle body. However, the tie rods 25, 25 are connected at the central part of the rack shaft 24 as mentioned above, enough distance between the tie rods 25, 25 and the gear case 22 provided at the one end of the rack shaft 24 is secured. Therefore, sufficient stroke of the rack shaft 24 required to acquire the necessary steering angle of the front wheels can be obtained.

What is claimed is:

1. A motor vehicle with a transversely-disposed engine comprising:
   a vehicle body having a front portion;
   a power plant including an engine, a transmission and a differential gear, each having an output shaft, said power plant being mounted in said vehicle body such that said output shafts are disposed in a widthwise direction of said vehicle body and said differential gear is positioned substantially forward of said engine;
   front wheels mounted in said front portion of said vehicle body;
   a mechanism for steering said front wheels and having a steering member extending in said widthwise direction of said vehicle body, said steering member being positioned above said output shaft of said engine and rearwardly of said engine;
   knuckle arms rotatably supported said front wheels and being swingably connected in said widthwise direction to arm members of a suspension mechaniam provided in said vehicle;
   tie rods connecting said knuckle arms to said steering member, said tie rods being connected at a center of said steering member; and
   a steering system which transmits a handling maneuver of a steering wheel of said vehicle to said steering member, said steering system having a pinion rotating in response to rotation of said steering wheel, said steering member being a rack shaft provided with a rack, said rack shaft engaging said pinion.

2. A motor vehicle with a transversely-disposed engine as defined in claim 1 wherein said engine having an upper portion is inclinedly mounted in said vehicle body in such a way that said upper portion protrudes in the forward direction.

3. A motor vehicle with a transversely-disposed engine as defined in claim 2 wherein an exhaust manifold and an air intake manifold are provided respectively at the front side of said engine and in the upper direction of the rear side of said engine, and said steering member is mounted in the lower direction of said air intake manifold.

4. A motor vehicle with a transversely-disposed engine as defined in claim 1 wherein said power plant has a gravitational center, said front wheel has an axis, said vehicle body has a vehicle cabin, and said power plant is mounted in said vehicle body in such a way that said gravitational center thereof is positioned of said front wheel axis and forward of said cabin.

5. A motor vehicle with a transversely-disposed engine as defined in claim 1 wherein said knuckle arms are furnished with rearwardly extending long arm portions with which said tie rods are connected.

6. A motor vehicle with a transversely-disposed engine as defined in claim 5 wherein said tie rods are connected with said long arm portions by means of pins.

7. A motor vechicle with a transversely-disposed engine as defined in claim 1 wherein said arm members are lower arms, and said knuckle arms are connected with said lower arms by means of king pins.

8. A motor vehicle with a transversely-disposed engine as defined in claim 7 wherein side frames are further mounted in a lower portion of said engine compartment in said vehicle body, and said lower arms are attached to said side frames.

9. A motor vehicle with a transversely-disposed engine as defined in claim 1 wherein said output shaft of said engine is a crank shaft, and said output shaft of said transmission is a primary shaft.

10. A motor vehicle with a transversely-disposed engine as defined in claim 1 further comprising a steering system which transmits a handling maneuver of a steering wheel to said steering member, said vehicle body having an engine compartment and a vehicle cabin partitioned by a dash panel, said steering system passing through said dash panel to be connected with said steering mechanism.

11. A motor vehicle with a transversely-disposed engine comprising:

a vehicle body having a front portion;

a power plant including an engine, said engine having an upper portion being inclined forwardly and upwardly relative to said vehicle body, a transmission and a differential gear, each of said engine, transmission and differential gear having an output shaft, said power plant being mounted in said vehicle body that said output shafts are disposed in a widthwise direction of said vehicle body and said differential gear being positioned substantially forward of said engine;

front wheels mounted in said front portion of said vehicle body;

mechanism for steering said front wheels and having a steering member extending in said widthwise direction of said vehicle body, said steering member being positioned above said output shaft of said engine and rearwardly of said engine;

knuckle arms rotatably supporting said front wheels and being swingably connected in said widthwise direction to arm members of a suspension mechanism provided in said vehicle; and tie rods connecting said knuckle arms to said steering member, said tie rods being connected at a center of said steering member, said steering member being positioned in a space, upwardly and rearwardly of said engine, created by said inclination of said engine upper portion.

12. A motor vehicle with a transversely-disposed engine as defined in claim 11 wherein an exhaust manifold and an air intake manifold are provided, respectively, at the front side of said engine and in the upper direction of the rear side of said engine, and said steering member is mounted in the lower direction of said air intake manifold.

13. A motor vehicle with a transversely-disposed engine as defined in claim 11 wherein said power plant has a gravitational center, said front wheel has an axis, said vehicle body has a vehicle cabin, and said power plant is mounted in said vehicle body such that said gravitational center thereof is positioned rearward of said front wheel axis and forward of said cabin.

14. A motor vehicle with a transversely-disposed engine as defined in claim 11 wherein said knuckle arms are furnished with rearwardly extending long arm portions with which said tie rods are connected.

15. A motor vehicle with a transversely-disposed engine as defined in claim 14 wherein said tie rods are connected with said long arm portions by means of pins.

16. A motor vehicle with a transversely-disposed engine as defined in claim 11 wherein said are members are lower arms, and said knuckle arms are connected with said lower arms by means of king pins.

17. A motor vehicle with a transversely-disposed engine as defined in claim 16 wherein side frames are further mounted in a lower portion of said engine compartment in said vehicle body, and said lower arms are attached to said side frames.

18. A motor vehicle with a transversely-disposed engine as defined in claim 11 wherein said output shaft of said engine is a crank shaft, and said output shaft of said transmission is a primary shaft.

19. A motor vehicle with a transversely-disposed engine as defined in a claim 11 further comprising a steering system which transmits a handling maneuver of a steering wheel to said steering member, said vehicle body having an engine compartment and a vehicle cabin partitioned by a dash panel, said steering system passing through said dash panel to be connected with said steering mechanism.

* * * * *